United States Patent
Velde et al.

(10) Patent No.: US 12,005,912 B2
(45) Date of Patent: Jun. 11, 2024

(54) SYSTEM AND METHOD FOR SELECTIVE DERATING OF SELF-PROPELLED WORK VEHICLE PARAMETERS BASED ON OPERATING MODES

(71) Applicant: Deere & Company, Moline, IL (US)

(72) Inventors: Todd F. Velde, Dubuque, IA (US); Benjamin J. Morrison, Dubuque, IA (US); John R. Mahrenholz, Dubuque, IA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 17/195,877

(22) Filed: Mar. 9, 2021

(65) Prior Publication Data
US 2022/0289221 A1    Sep. 15, 2022

(51) Int. Cl.
*B60W 50/08*    (2020.01)
*B60W 30/18*    (2012.01)
(Continued)

(52) U.S. Cl.
CPC .... *B60W 50/082* (2013.01); *B60W 30/18036* (2013.01); *B60W 50/06* (2013.01);
(Continued)

(58) Field of Classification Search
CPC ......... B60W 50/082; B60W 30/18036; B60W 50/06; B60W 50/085; B60W 50/10; B60W 2420/403; B60W 2510/20; B62D 15/02
See application file for complete search history.

(56) References Cited

U.S. PATENT DOCUMENTS

| | | | |
|---|---|---|---|
| 6,694,240 B1 * | 2/2004 | Swick | E02F 9/2012 701/50 |
| 8,527,124 B2 | 9/2013 | Velde et al. | |

(Continued)

FOREIGN PATENT DOCUMENTS

| | | |
|---|---|---|
| DE | 102005023672 A1 | 2/2006 |
| DE | 112011102099 T5 | 7/2013 |
| DE | 102016111665 A1 | 12/2017 |

OTHER PUBLICATIONS

German Search Report issued in application No. DE102022200827.8 dated Jun. 30, 2022 (10 pages).

*Primary Examiner* — Aniss Chad
*Assistant Examiner* — Stephanie T Su
(74) *Attorney, Agent, or Firm* — Gary L. Montle; Lucian Wayne Beavers; Patterson Intellectual Property Law, PC (57) ABSTRACT

A method is provided for controlling a self-propelled work vehicle comprising a work attachment and at least left and right ground engaging units driven by respective first and second drivetrains. Upon determining transition from a first operating mode to a second operating mode (e.g., creep mode), the method includes selectively derating at least a portion of the drivetrain speed commands corresponding to propulsion of the work vehicle (e.g., the average of left and right track speeds), independent of a portion of the drivetrain speed commands corresponding to steering (e.g., the difference between the track speeds). The derate value may optionally be applied only to propulsion commands that produce forward motion, and not for reverse motion. Separate (non-zero) derate settings may optionally be provided for reverse and/or steering functions. Derate functionality may optionally be implemented upon detecting particular types (e.g. dozer) of attachments, or an associated work state.

19 Claims, 3 Drawing Sheets

(51) Int. Cl.
*B60W 50/06* (2006.01)
*B60W 50/10* (2012.01)
*B62D 15/02* (2006.01)

(52) U.S. Cl.
CPC .......... *B60W 50/085* (2013.01); *B60W 50/10* (2013.01); *B62D 15/02* (2013.01); *B60W 2420/403* (2013.01); *B60W 2510/20* (2013.01)

(56) References Cited

U.S. PATENT DOCUMENTS

| | | |
|---|---|---|
| 9,956,874 B2 | 5/2018 | Velde et al. |
| 2001/0045317 A1* | 11/2001 | Abend .................. B62D 11/18 180/367 |
| 2010/0299032 A1 | 11/2010 | Roth |
| 2015/0159347 A1 | 6/2015 | Park et al. |
| 2018/0244257 A1* | 8/2018 | Kneitz .................. B60W 10/06 |
| 2019/0337386 A1* | 11/2019 | Anderson ............... E02F 9/202 |
| 2019/0338496 A1* | 11/2019 | Bozdech ............... E02F 9/2253 |
| 2020/0181880 A1* | 6/2020 | Meyer .................... G05G 9/047 |

* cited by examiner

SYSTEM AND METHOD FOR SELECTIVE DERATING OF SELF-PROPELLED WORK VEHICLE PARAMETERS BASED ON OPERATING MODES

FIELD OF THE DISCLOSURE

The present disclosure relates generally to self-propelled work vehicles such as skid steer loaders, and more particularly to systems and methods for selective derating of operating parameters such as for example drivetrain speed commands in such self-propelled work vehicles.

BACKGROUND

Self-propelled work vehicles of this type may typically include skid steer loaders, crawler dozers, and compact track loaders, but may also relate to for example excavator machines, forestry machines, front shovel machines, and others having a work implement such as a dozer blade or bucket that can be manipulated to perform various work functions. Various potential and unique challenges may face an operator of a particular work vehicle with its respective functions, control systems, user input parameters, standardized attachments, and their respective dependencies. In addition, a number of different attachments catered towards different functionalities may be coupled with several different types of work vehicles.

In the context of a skid steer loader, conventional designs exist in which an operator can select a creep setting, which further universally applies a scalar derate value to their drivetrain speed commands. When using certain types of working implements, such as for example a dozer attachment, this may result in undesirably slow reverse speed, underpowered steering, underpowered tracking, and the like.

It would be desirable to more selectively apply derate values to relevant portions of the drivetrain commands, such that the advantages of, e.g., a selectable creep mode are made available while simultaneously avoiding the undesirable side effects of conventional implementation thereof.

BRIEF SUMMARY

The current disclosure provides an enhancement to conventional systems, at least in part by introducing a novel system and method for selective application of a creep derate feature.

For example, a creep derate value may be applied only to a propulsion portion of the drivetrain command (e.g., an average of the two track speeds) and not to a steering portion of the drivetrain command (e.g., a difference between the track speeds).

As another example, the creep derate value may be selectively applied only to propulsion commands that result in forward motion, and not for reverse motion.

As another example, separate and independent creep settings may be implemented for reverse motion and/or for steering, relative to forward motion.

As another example, creep functionality can be tied to the presence of specific work implements such as a dozer attachment, or the active state of a related (e.g., dozer) control mode. In addition or alternatively, creep functionality may be selectively disabled by an operator of the work vehicle via an operator interface tool.

In one embodiment, a computer-implemented method as disclosed herein is provided for controlling a self-propelled work vehicle comprising a plurality of ground engaging units and at least one work attachment configured for controllably working terrain, wherein at least one ground engaging unit is disposed on each of left and right sides of a work vehicle chassis and driven by respective first and second drivetrains. The method comprises steps of determining a transition from a first operating mode to a second operating mode for the self-propelled work vehicle, and further selectively derating at least a portion of the drivetrain speed commands corresponding to propulsion of the work vehicle, independent of a portion of the drivetrain speed commands corresponding to steering of the work vehicle.

In one exemplary aspect according to the above-referenced embodiment, at least a portion of the drivetrain speed commands may be selectively derated corresponding to forward propulsion of the work vehicle, independent of a portion of the drivetrain speed commands corresponding to reverse propulsion of the work vehicle.

In another exemplary aspect according to the above-referenced embodiment, a first derate value may be applied to the portion of the drivetrain speed commands corresponding to forward propulsion of the work vehicle, and a second derate value may be applied to the portion of the drivetrain speed commands corresponding to reverse propulsion of the work vehicle.

In another exemplary aspect according to the above-referenced embodiment, a first derate value may be applied to the portion of the drivetrain speed commands corresponding to propulsion of the work vehicle, and a second derate value may be applied to the portion of the drivetrain speed commands corresponding to steering of the work vehicle.

In another exemplary aspect according to the above-referenced embodiment, the step of determining of the transition from the first operating mode to the second operating mode may include detecting an associated user selection via an onboard user interface. This optional aspect may further include detecting a type of attachment coupled to the chassis and applying a derate value corresponding to the detected type of attachment while in the second operating mode. This optional aspect may in addition, or alternatively, include determining a work state corresponding to a type of attachment coupled to the chassis and applying a derate value corresponding to the detected work state while in the second operating mode. In this case, the determining of the work state may include classifying sequences of data from one or more onboard sensors into different predetermined work states, receiving input signals from at least one of the one or more onboard sensors, and predicting the work state based a comparison of the received input signals to the classified sequences of data.

In another exemplary aspect according to the above-referenced embodiment, one or more further operator commands via an onboard user interface may selectively enable or disable the derating of the drivetrain speed commands.

In another exemplary aspect according to the above-referenced embodiment, the determining of the transition from the first operating mode to the second operating mode may include detecting a type of attachment coupled to the chassis and automatically applying a derate value corresponding to the detected type of attachment while in the second operating mode.

In another exemplary aspect according to the above-referenced embodiment, the determining of the transition from the first operating mode to the second operating mode may include determining a work state corresponding to a type of attachment coupled to the chassis and applying a derate value corresponding to the detected work state while in the second operating mode.

In another embodiment, a self-propelled work vehicle as disclosed herein may comprise a plurality of ground engaging units, wherein at least one ground engaging unit is disposed on each of left and right sides of a work vehicle chassis and driven by respective first and second drivetrains, at least one work attachment configured for controllably working terrain, and a controller configured for providing drivetrain speed commands to the first and second drivetrains. The controller is further configured to direct the performance of steps according to the above-referenced method embodiment and optionally of some or all of the associated exemplary aspects.

Numerous objects, features and advantages of the embodiments set forth herein will be readily apparent to those skilled in the art upon reading of the following disclosure when taken in conjunction with the accompanying drawings.

DETAILED DESCRIPTION

Figure 1:
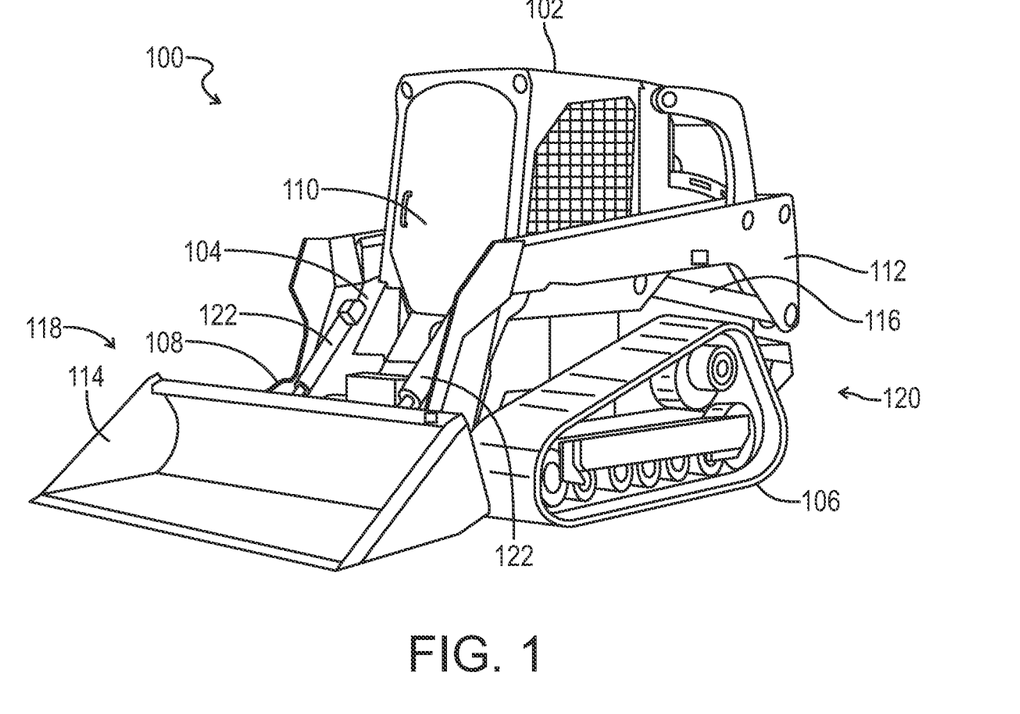
FIG. 1 is an isometric side view representing an exemplary self-propelled work vehicle according to the present disclosure.
Figure 2:
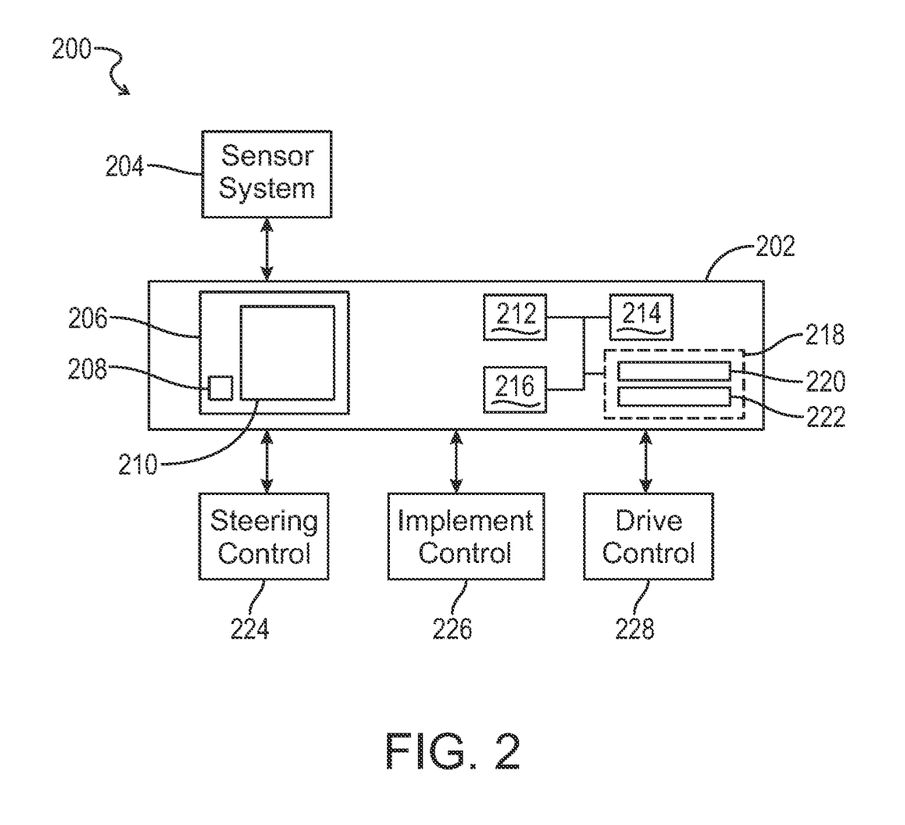
FIG. 2 is a block diagram representing an exemplary control system according to an embodiment of the present disclosure.
Figure 3:
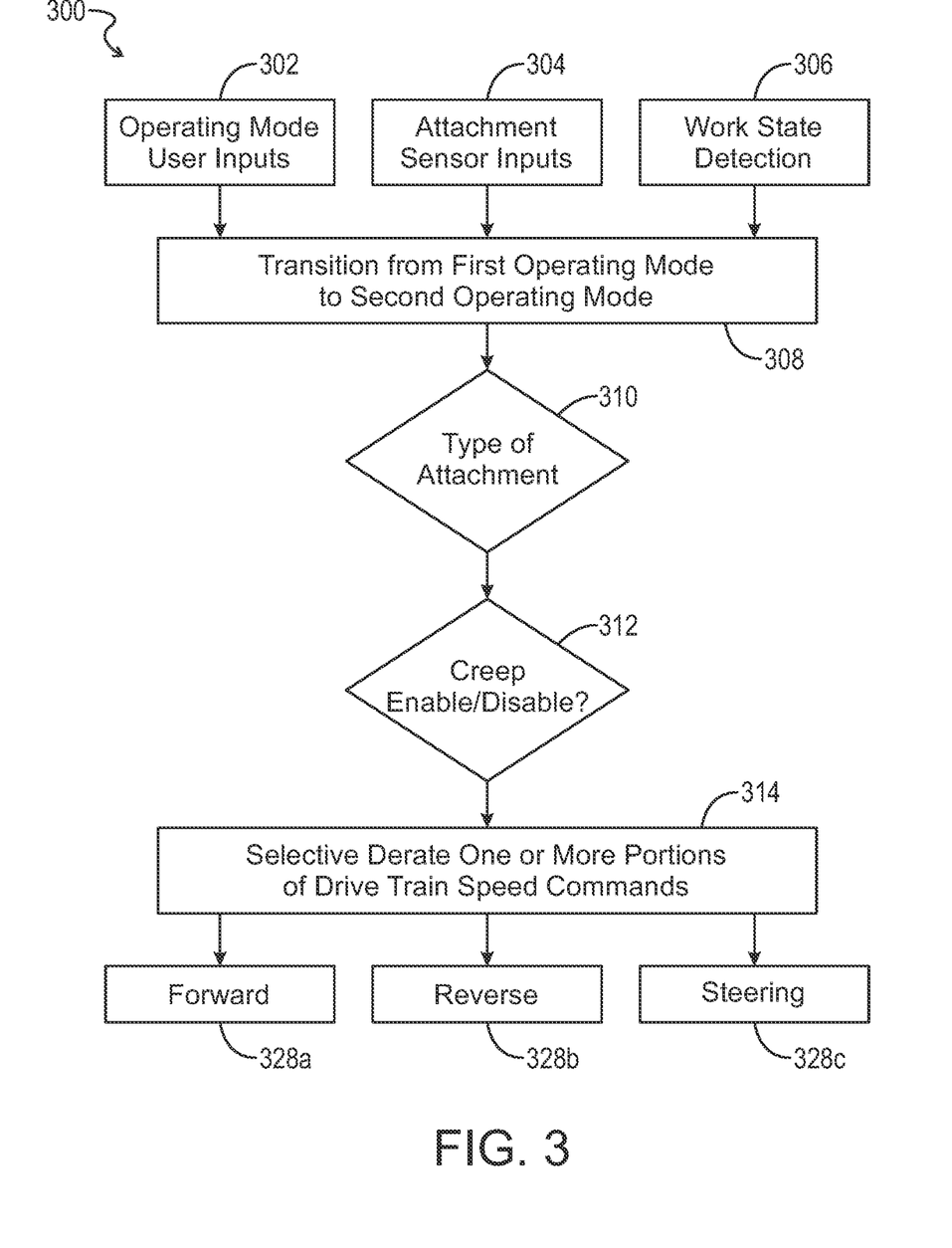
FIG. 3 is a flowchart representing an exemplary method according to an embodiment of the present disclosure.

Referring now to FIGS. 1-3, various embodiments may now be described of an inventive system and method.

FIG. 1 in a particular embodiment as disclosed herein shows a representative self-propelled work vehicle 100 in the form of, for example, a tracked loader 100. The work vehicle 100 may have a front-end portion 118, a rear-end portion 120, and a cab 102 coupled to a frame 104. Also coupled to the frame 104 may be a first ground engaging unit (e.g., track assembly) 106 and a second ground engaging unit (e.g., track assembly) 108. Although the illustrated work machine includes tracks as the ground engaging units 106, 108, other embodiments can include one or more wheels that engage the ground surface.

An operator may be positioned in the cab 102 and have access to a user interface associated 206 with a plurality of user-actuatable controls 110. The plurality of controls may include joysticks, levers, wheels, push buttons, switches, knobs, dials, and any other known control mechanism for controlling a function of the work vehicle 100. The work vehicle 100 may further include at least one drive unit (not shown) including for example a travel motor for driving the respective ground engaging units 106, 108.

As used herein, directions with regard to work vehicle 100 may be referred to from the perspective of an operator seated within the operator cab 102; the left of the work vehicle 100 is to the left of such an operator, the right of the work vehicle is to the right of such an operator, the front-end portion 118 (or fore) of the work vehicle is the direction such an operator faces, the rear-end portion 120 (or aft) of the work vehicle is behind such an operator, the top of the work vehicle is above such an operator, and the bottom of the work vehicle below such an operator. In order to turn, the ground-engaging unit(s) 106 on the left side of the work vehicle may be operated at a different speed, or in a different direction, from the ground-engaging unit(s) 108 on the right side of the work vehicle 100. In a conventional compact track loader or skid steer loader, the operator can manipulate controls from inside an operator cab 102 to drive the ground engaging units on the right and/or left side of the work vehicle 100.

In the embodiment shown, each track assembly as the ground engaging units 106, 108 may include (although not shown) a drivetrain comprising a front idler wheel, a rear idler sprocket, two bogie roller assemblies and a drive sprocket pivotally coupled to the undercarriage frame 104. The drive sprocket may be coupled to the undercarriage frame 104 through a drive motor (not shown) to provide torque to the drive sprocket that in turn rotates a drive track that encompasses or substantially surrounds the track assembly. In the example of a skid steer loader, each of the left-side and right-side ground engaging units 106, 108 are typically powered by a hydraulic motor connected to the respective sprocket which may further provide for gear reduction to increase the torque.

The work vehicle 100 may also have a pair of boom arms 112 pivotally coupled to the frame 104 at respective first ends and to an attachment 114 or work implement 114 at respective opposite ends. Exemplary and non-limiting attachments 114 may include a bucket as commonly used to move volumes of material from one area to another, or load material into another work vehicle 100 such as an articulated dump truck, or a blade which may engage the ground or material to move material from one location to another and/or to shape the ground by creating features including flat area, grades, hills, roads, and the like.

In an embodiment, the boom arms 112 may be moveable relative to the frame 104 by a pair of first hydraulic cylinders 116, wherein the hydraulic cylinders 116 may also conventionally be referred to as a pair of lift cylinders 116 (one coupled to each boom arm 112) for a compact track loader. An attachment coupler (not shown) may be coupled to a forward section of the pair of boom arms 112, being moveable relative to the frame 104 by a pair of second hydraulic cylinders 122, conventionally referred to as tilt cylinders 122 for a compact track loader. The frame 104 of the work vehicle 100 may further include a hydraulic coupler (not shown) on the front-end portion 118 of the work vehicle 100 to couple one or more auxiliary hydraulic cylinders (not shown) to drive movement of or actuate auxiliary functions of an attachment 114. The attachment coupler enables the mechanical coupling of the attachment 114 to the frame 104. The hydraulic coupler, contrary to the attachment coupler, enables the hydraulic coupling of an auxiliary hydraulic cylinder(s) on the attachment 114 to the hydraulic system of the work vehicle 100.

It should be noted that for certain exemplary attachments 114 (such as buckets) coupled to a compact track loader, the attachment 114 may not use a hydraulic coupler or have auxiliary hydraulic cylinders.

A work vehicle 100 as disclosed herein is not limited to tracked skid steer loaders or compact track loaders, but rather any number of various types of work vehicle that utilizes an implement 114 may fall within the scope of the present disclosure, including for example work vehicles that use wheels instead of tracks, are of larger size, and/or are used in different industries than is typical for, e.g., skid steer loaders. Accordingly, a backhoe, motor grader, dozer, dump truck, excavator, crawler, or various other equivalent work vehicles may be considered as within the scope of the present disclosure even if not explicitly described herein.

As schematically illustrated in FIG. 2, the work vehicle 100 includes a portion of a vehicle control system 200 including a controller 202. The controller 202 may be an integral part of the control system of the work vehicle, or it may be a separate control module. The controller 202 may include the user interface 206 and optionally be mounted in the operator's cab 102 at a control panel. The controller 202 may for example be in communication with electrical devices (solenoids, motors) which may be actuated by a joystick in the operator cab 102. Other alternative inputs on a user interface 206 with electric, or hydraulic pressure signals may include switches, buttons, roller tabs, sliding tabs, infinity switches, touchscreens, foot pedals, virtual operative signaling, to name a few.

The controller 202 is configured to receive input signals from some or all of various sensors collectively defining a sensor system 204. Certain of these sensors may be provided to detect machine operating conditions or positioning, including for example an orientation sensor, global positioning system (GPS) sensors, vehicle speed sensors, vehicle implement positioning sensors, and the like, and whereas one or more of these sensors may be discrete in nature the sensor system 204 may further refer to signals provided from the machine control system.

The controller 202 may selectively produce output signals to the user interface 206 for display to the human operator. The controller 202 may further or in the alternative generate control signals for controlling the operation of respective actuators, or signals for indirect control via intermediate control units, associated with a machine steering control system 224, a machine implement control system 226, and/or a machine drive control system 228. The controller 202 may for example generate control signals for controlling the operation of various actuators, such as hydraulic motors or hydraulic piston-cylinder units 116, 122, and electronic control signals from the controller 202 may actually be received by electro-hydraulic control valves associated with the actuators such that the electro-hydraulic control valves will control the flow of hydraulic fluid to and from the respective hydraulic actuators to control the actuation thereof in response to the control signal from the controller 202. The controller 202 further communicatively coupled to a hydraulic system as machine implement control system 226 may accordingly be configured to operate the work vehicle 100 and operate an attachment 114 coupled thereto, including, without limitation, the attachment's lift mechanism, tilt mechanism, roll mechanism, pitch mechanism and auxiliary mechanisms, for example. The controller 202 further communicatively coupled to a hydraulic system as machine steering control system 224 and/or machine drive control system 228 may be configured for moving the work vehicle in forward and reverse directions, moving the work vehicle left and right, controlling the speed of the work vehicle's travel, etc.

The controller 202 includes or may be associated with a processor 212, a computer readable medium 214, a communication unit 216, data storage 218 such as for example a database network, and the aforementioned user interface 206 or control panel 206 having a display 210. An input/output device 208, such as a keyboard, joystick or other user interface tool 208, is provided so that the human operator may input instructions to the controller 202. It is understood that the controller described herein may be a single controller having all of the described functionality, or it may include multiple controllers wherein the described functionality is distributed among the multiple controllers.

Various operations, steps or algorithms as described in connection with the controller 202 can be embodied directly in hardware, in a computer program product such as a software module executed by the processor 212, or in a combination of the two. The computer program product can reside in RAM memory, flash memory, ROM memory, EPROM memory, EEPROM memory, registers, hard disk, a removable disk, or any other form of computer-readable medium 214 known in the art. An exemplary computer-readable medium can be coupled to the processor such that the processor can read information from, and write information to, the memory/storage medium. In the alternative, the medium can be integral to the processor. The processor and the medium can reside in an application specific integrated circuit (ASIC). The ASIC can reside in a user terminal. In the alternative, the processor and the medium can reside as discrete components in a user terminal.

The term "processor" 212 as used herein may refer to at least general-purpose or specific-purpose processing devices and/or logic as may be understood by one of skill in the art, including but not limited to a microprocessor, a microcontroller, a state machine, and the like. A processor can also be implemented as a combination of computing devices, e.g., a combination of a DSP and a microprocessor, a plurality of microprocessors, one or more microprocessors in conjunction with a DSP core, or any other such configuration.

The communication unit 216 may support or provide communications between the controller 202 and external systems or devices, and/or support or provide communication interface with respect to internal components of the work vehicle 100. The communications unit may include wireless communication system components (e.g., via cellular modem, WiFi, Bluetooth or the like) and/or may include one or more wired communications terminals such as universal serial bus ports.

The data storage 218 in an embodiment may be configured to receive and store information selectively retrievable by the controller 202 to execute operations as further discussed herein, including for example but in no way limited to real-time and/or historical data sets, operating characteristics, lookup tables, and/or databases regarding machine parameters corresponding to different work states 220, operating modes 222, or the like. Data storage 218 as discussed herein may, unless otherwise stated, generally encompass conventional hardware such as volatile or non-volatile storage devices, drives, memory, or other storage media, as well as one or more databases residing thereon.

Referring next to FIG. 3, an embodiment method 300 may now be described which is exemplary but not limiting on the scope the present disclosure unless otherwise specifically noted. One of skill in the art may appreciate that alternative embodiments may include fewer or additional steps, and that certain disclosed steps may for example be performed in different chronological order or simultaneously.

The method 300 includes a step of automatically transitioning at least one control aspect of a self-propelled work vehicle 100 from a first operating mode to a second operating mode 308 based on inputs which may include manually provided user inputs 302, attachment sensor inputs 304, and/or an indirectly detected work state 306.

In an embodiment, the manually provided user inputs 302 may directly include a command for transition to the second operating mode (e.g., creep mode) via a user interface tool 208 such as a button or switch. In other embodiments, the manually provided user inputs 302 may relate to other commands which are used by the control system to determine that a second operating mode (e.g., creep mode) is appropriate, or the control system may rely entirely on the attachment sensor inputs 304 and/or indirectly detected work state 306 in the absence of direct user inputs. For example, the second operating mode may optionally be triggered automatically upon user selection of an attachment 114, or automated identification of an attachment 114, such as a dozer blade coupled to the work vehicle 100.

The method 300 may determine an operating mode via attachment sensor inputs 304 corresponding to the presence of a particular attachment 114, or in some embodiments a sensed location, movements over time, and/or orientation of at least one attachment 114 to the work vehicle 100. In an embodiment, an identification device (not shown) may be provided in association with the attachment 114 and configured to emit an identification signal (e.g., via Bluetooth) prior to, during, or after coupling of the attachment 114 to the work vehicle 100, wherein the identification signal may be received by the controller 202 (directly or indirectly via one or more intervening components) and processed to identify the attachment and/or type of attachment. In another embodiment, an identification device provided in association with the attachment 114 may include machine readable indicia that may be captured by an imaging device associated with the work vehicle 100 and processed to identify the particular attachment and/or type of attachment. As previously noted, the processing may for example be performed by the controller 202, which may be further configured to wait or standby until predetermined attachment change criteria are met, wherein the controller 202 determines or otherwise confirms when a new attachment 114 has been coupled to the work vehicle 100. In various embodiments, the controller 202 may proceed automatically upon coupling of the attachment 114 to the work vehicle 100, or the operator may be prompted to determine when the attachment criteria are met and initiate subsequent operations by actuating a user interface tool 208 such as a switch on the control panel. For example, the received identification signal or machine readable indicia may not directly identify the particular attachment and/or type of attachment, but may indicate the coupling of a different attachment 114 (e.g., a change from one attachment to another attachment), wherein the operator may be prompted to select the attachment and/or type of attachment via a user interface tool 208 such as pop-up menu on a display screen 210 on the control panel 206 aggregating all identification signals received, or a pre-populated list from data storage 218.

The active work state of the vehicle and/or one or more attachments 114 may be indirectly determined based one or more sensor inputs and/or operator commands, corresponding for example to a combination of conditions, parameters, or settings relating to hydraulic flow, load (e.g., as a function of tractive loads and/or external hydraulic loads), ground slope/orientation, commanded movements, and the like. In some cases, where for example one or more sensors for direct sensing 304 of a desired variable may be unavailable or otherwise preferably not implemented for a given application, the work state identification 306 may be provided using onboard machine learning algorithms trained via time series data values for one or more variables indirectly relevant for a given work state, wherein the model is further verified over time using test data inputs which may relate to the same or analogous sources. Generally stated, work state estimation may encompass the classifying of sequences of data recorded by sensors into defined machine states, and subsequently determining a current work state based on the identification of such sequences. In some embodiments, work state estimation may accordingly provide inputs to a controller 202 for indirectly determining a transition from a first operating mode to a second operating mode (e.g., creep mode) for the self-propelled work vehicle 100, even in the absence of direct inputs from an operator or direct sensor inputs corresponding to the second operating mode.

The method 300 may continue by selectively derating one or more portions of drivetrain speed commands 314. In an embodiment wherein a creep mode is selectively applied for example to drivetrain speed commands corresponding to forward propulsion of the work vehicle 100, the controller 202 may generate commands to limit travel or ground speed of the ground engaging units 106, 108 while substantially maintaining engine speed and/or power.

In various embodiments, the selective derating function may be linked to preconditions including (in step 310) determining a type of attachment for the self-propelled work vehicle 100, and determining (in step 312) whether a specified condition (e.g., creep setting) exists, for example via an operator command or manual setting as previously noted, that requires a drivetrain derate step for the corresponding type of attachment. In an embodiment, a creep function may be automatically enabled upon a detected coupling of a particular attachment and/or type of attachment (e.g., dozer blade), with a specified derate (creep) value corresponding to the particular attachment and/or type of attachment.

As one example, a derate value may be selectively applied to a propulsion portion of drivetrain commands (e.g., an average of the left-side and right-side track speeds) as distinguished from a steering portion of the drivetrain commands (e.g., a difference between the left-side and right-side track speeds), and more particularly to the propulsion portion of drivetrain commands relating to forward motion 328a as distinguished from reverse motion. The method 300 may therefore apply appropriately derated drivetrain speed commands for forward movement, while at the same time preventing the undesirably slow reverse speeds that may otherwise be associated with a scalar derate to drivetrain commands when for example using a dozer attachment 114.

As another example, the derate control functions could further include and implement a separate creep setting for the propulsion portion of drivetrain commands relating to reverse motion 328b. In other words, a creep setting may be appropriate or otherwise desirable for drivetrain speed commands during reverse operation of a work vehicle 100 having for example a dozer attachment 114, but such creep setting may preferably differ from the creep setting for forward motion. The separate creep settings may for example be retrievably stored in data storage 218 and selectively implemented by the controller 202 upon determining the attachment and/or type of attachment.

As another example, the derate control functions could further include and implement a separate creep setting for the steering portion of the drivetrain commands 328c. In other words, a creep setting may be appropriate or otherwise desirable for drivetrain commands during steering operations of a work vehicle 100 having for example a dozer attachment 114, but such creep setting may preferably differ from the creep setting for propulsion generally, or from forward motion in particular. The separate creep settings may for example be retrievably stored in data storage 218 and selectively implemented by the controller 202 upon determining the attachment and/or type of attachment.

In an embodiment, creep derate settings corresponding to propulsion commands resulting in forward motion, propulsion commands resulting in reverse motion, and/or steering commands may be further adjusted or dependent on other sensed or indirectly determined factors such as ground surface condition, grade/slope, load, slip, and the like.

In an embodiment, creep derate settings corresponding to propulsion commands resulting in forward motion, propulsion commands resulting in reverse motion, and/or steering commands may be enabled, suspended, and/or disabled via operator commands provided from an onboard user interface 206. For example, the controller 202 may determine that a creep mode is appropriate for a given type of attachment or a given type of commanded motion, but the user interface 206 may be configured to enable operator inputs at least with respect to automation of the derate application.

As used herein, the phrase "one or more of," when used with a list of items, means that different combinations of one or more of the items may be used and only one of each item in the list may be needed. For example, "one or more of" item A, item B, and item C may include, for example, without limitation, item A or item A and item B. This example also may include item A, item B, and item C, or item B and item C.

One of skill in the art may appreciate that when an element herein is referred to as being "coupled" to another element, it can be directly connected to the other element or intervening elements may be present.

Thus, it is seen that the apparatus and methods of the present disclosure readily achieve the ends and advantages mentioned as well as those inherent therein. While certain preferred embodiments of the disclosure have been illustrated and described for present purposes, numerous changes in the arrangement and construction of parts and steps may be made by those skilled in the art, which changes are encompassed within the scope and spirit of the present disclosure as defined by the appended claims. Each disclosed feature or embodiment may be combined with any of the other disclosed features or embodiments.

What is claimed is:

1. A computer-implemented method of controlling a self-propelled work vehicle comprising a plurality of ground engaging units and at least one work attachment configured for controllably working terrain, wherein at least one ground engaging unit is disposed on each of left and right sides of a work vehicle frame and driven by respective first and second drivetrains, the method comprising:
    during a first operating mode, applying first drivetrain speed commands for driving each of the at least one left-side ground engaging unit and second drivetrain speed commands for driving each of the at least one right-side ground engaging unit, wherein an average speed of the at least one left-side ground engaging unit and the at least one right-side ground engaging unit corresponds to a propulsion command of the work vehicle and a difference between the speed of the at least one left-side ground engaging unit and the speed of the at least one right-side ground engaging unit corresponds to a steering command of the work vehicle;
    determining a transition from a first operating mode to a second operating mode for the self-propelled work vehicle; and
    during the second operating mode, derating at least a portion of the first and second drivetrain speed commands corresponding to the propulsion command of the work vehicle and accordingly the average speed of the respective left-side and right-side ground engaging units, while substantially maintaining a portion of the first and second drivetrain speed commands corresponding to the steering command of the work vehicle and accordingly the difference between the speeds of the respective left-side and right-side ground engaging units.

2. The method of claim 1, further comprising: selectively derating at least a portion of the drivetrain speed commands corresponding to forward propulsion of the work vehicle, independent of a portion of the drivetrain speed commands corresponding to reverse propulsion of the work vehicle.

3. The method of claim 2, comprising:
    a first derate value applied to the portion of the drivetrain speed commands corresponding to forward propulsion of the work vehicle; and
    a second derate value different from the first derate value applied to the portion of the drivetrain speed commands corresponding to reverse propulsion of the work vehicle.

4. The method of claim 1, wherein:
    the determining of the transition from the first operating mode to the second operating mode comprises detecting an associated user selection via an onboard user interface.

5. The method of claim 4, further comprising:
    detecting a type of attachment coupled to the chassis; and
    applying a derate value corresponding to the detected type of attachment while in the second operating mode.

6. The method of claim 1, further comprising:
    classifying sequences of data from one or more onboard sensors into different predetermined work states;
    receiving input signals from at least one of the one or more onboard sensors;
    predicting a work state based a comparison of the received input signals to the classified sequences of data; and
    applying a derate value corresponding to the predicted work state while in the second operating mode.

7. The method of claim 1, wherein:
    one or more further operator commands via an onboard user interface selectively enable, suspend, or disable the derating of the drivetrain speed commands.

8. The method of claim 1, wherein:
    the determining of the transition from the first operating mode to the second operating mode comprises detecting a type of attachment coupled to the chassis and automatically applying a derate value corresponding to the detected type of attachment while in the second operating mode.

9. The method of claim 1, wherein:
    the determining of the transition from the first operating mode to the second operating mode comprises
    classifying sequences of data from one or more onboard sensors into different predetermined work states,
    receiving input signals from at least one of the one or more onboard sensors,
    detecting a work state based a comparison of the received input signals to the classified sequences of data, and
    the method further comprises applying a derate value corresponding to the detected work state while in the second operating mode.

10. A self-propelled work vehicle comprising:
    a plurality of ground engaging units, wherein at least one ground engaging unit is disposed on each of left and right sides of a work vehicle frame and driven by respective first and second drivetrains;
    at least one work attachment configured for controllably working terrain; and
    a controller configured to
        during a first operating mode, apply first drivetrain speed commands to the left-side ground engaging units and second drivetrain speed commands to the right-side ground engaging units, wherein an average speed of the at least one left-side ground engaging unit and the at least one right-side ground engaging unit corresponds to a propulsion command of the work vehicle and a difference between the respective speeds of the at least one left-side ground engaging unit and the at least one right-side ground engaging unit corresponds to a steering command of the work vehicle;

determine a transition from a first operating mode to a second operating mode for the self-propelled work vehicle, and upon determining the transition to the second operating mode, derate at least a portion of the first and second drivetrain speed commands corresponding to the propulsion command of the work vehicle and accordingly the average speed of the respective left-side and right-side ground engaging units, while substantially maintaining a portion of the first and second drivetrain speed commands corresponding to the steering command of the work vehicle and accordingly the a difference between the speeds of the respective left-side and right-side ground engaging units.

11. The self-propelled work vehicle of claim 10, wherein: the controller is configured to selectively derate at least a portion of the drivetrain speed commands corresponding to forward propulsion of the work vehicle, independent of a portion of the drivetrain speed commands corresponding to reverse propulsion of the work vehicle.

12. The self-propelled work vehicle of claim 11, comprising:

a first derate value applied to the portion of the drivetrain speed commands corresponding to forward propulsion of the work vehicle; and a second derate value different from the first derate value applied to the portion of the drivetrain speed commands corresponding to reverse propulsion of the work vehicle.

13. The self-propelled work vehicle of claim 10, wherein: the determining of the transition from the first operating mode to the second operating mode comprises detecting an associated user selection via an onboard user interface, and the controller is configured to detect a type of attachment coupled to the chassis and apply a derate value corresponding to the detected type of attachment while in the second operating mode.

14. The self-propelled work vehicle of claim 10, wherein: the determining of the transition from the first operating mode to the second operating mode comprises detecting an associated user selection via an onboard user interface, and the controller is configured to:
classify sequences of data from one or more onboard sensors into different predetermined work states;
receive input signals from at least one of the one or more onboard sensors;
detect a work state based a comparison of the received input signals to the classified sequences of data; and
apply a derate value corresponding to the detected work state while in the second operating mode.

15. The self-propelled work vehicle of claim 10, wherein: one or more further operator commands via an onboard user interface selectively enable, suspend, or disable the derating of the drivetrain speed commands.

16. The self-propelled work vehicle of claim 10, wherein: the determining of the transition from the first operating mode to the second operating mode comprises detecting a type of attachment coupled to the chassis and automatically applying a derate value corresponding to the detected type of attachment while in the second operating mode.

17. The self-propelled work vehicle of claim 10, wherein: the determining of the transition from the first operating mode to the second operating mode comprises
classifying sequences of data from one or more onboard sensors into different predetermined work states,
receiving input signals from at least one of the one or more onboard sensors,
detecting a work state based a comparison of the received input signals to the classified sequences of data, and
the controller is configured to apply a derate value corresponding to the detected work state while in the second operating mode.

18. A computer-implemented method of controlling a self-propelled work vehicle comprising a plurality of ground engaging units and at least one work attachment configured for controllably working terrain, wherein at least one ground engaging unit is disposed on each of left and right sides of a work vehicle frame and driven by respective first and second drivetrains, the method comprising:

during a first operating mode, selectively applying first drivetrain speed commands for driving the left-side ground engaging units and second drivetrain speed commands for driving the right-side ground engaging units, wherein an average speed of the left-side ground engaging units and the right-side ground engaging units corresponds to a propulsion command of the work vehicle and a difference between the respective speeds of the left-side ground engaging units and the right-side ground engaging units corresponds to a steering command of the work vehicle;

determining a transition from a first operating mode to a second operating mode for the self-propelled work vehicle; and during the second operating mode, selectively applying a first derate value to at least a portion of the first and second drivetrain speed commands corresponding to the propulsion command of the work vehicle and accordingly the average speed of the respective left-side and right-side ground engaging units, and selectively applying a second derate value to a portion of the first and second drivetrain speed commands corresponding to the steering command of the work vehicle and accordingly the difference between the speeds of the respective left-side and right-side ground engaging units.

19. The method of claim 18, wherein a first derate value applied to the at least a portion of the first and second drivetrain speed commands corresponding to forward propulsion command of the work vehicle is different from a first derate value applied to the at least a portion of the first and second drivetrain speed commands corresponding to reverse propulsion command of the work vehicle.

* * * * *